(12) United States Patent
Kaps et al.

(10) Patent No.: US 9,729,341 B2
(45) Date of Patent: Aug. 8, 2017

(54) BUILDING AUTOMATION AND BUILDING INFORMATION SYSTEM

(75) Inventors: Werner Kaps, Weiler (DE); Helmut Simon, Argenbuehl (DE); Armin Leonhardt, Wangen (DE); Christian Roth, Wangen (DE); Jens Petersohn, Wangen (DE)

(73) Assignees: Viessmann Hausautomation GmbH, Wangen (DE); Diehl Ako Stiftung & Co., KG, Wangen (DE)

( * ) Notice: Subject to any disclaimer, the term of this patent is extended or adjusted under 35 U.S.C. 154(b) by 608 days.

(21) Appl. No.: 13/501,411

(22) PCT Filed: Oct. 21, 2010

(86) PCT No.: PCT/EP2010/065870
§ 371 (c)(1),
(2), (4) Date: Jul. 31, 2012

(87) PCT Pub. No.: WO2011/048181
PCT Pub. Date: Apr. 28, 2011

(65) Prior Publication Data
US 2012/0296451 A1 Nov. 22, 2012

(30) Foreign Application Priority Data
Oct. 21, 2009 (DE) .................. 10 2009 050 170

(51) Int. Cl.
*H04L 12/28* (2006.01)
*H04L 29/08* (2006.01)
*F24F 11/00* (2006.01)

(52) U.S. Cl.
CPC ............ *H04L 12/282* (2013.01); *H04L 67/12* (2013.01); *H04L 67/125* (2013.01);
(Continued)

(58) Field of Classification Search
USPC ............................................. 700/83; 709/223
See application file for complete search history.

(56) References Cited

U.S. PATENT DOCUMENTS 5,061,916 A * 10/1991 French et al. ............... 340/522
5,128,855 A * 7/1992 Hilber et al. .................... 700/3
(Continued)

FOREIGN PATENT DOCUMENTS

| CN | 101246356 A | 8/2008 |
|----|-------------|--------|
| DE | 35 14 334 | 10/1986 |

(Continued)

OTHER PUBLICATIONS

KMC Controls, "Green Building and Controls Glossary", 2008, Retrieved from the Internet on Oct. 22, 2014 at "www.kmccontrols.com".*

(Continued)

*Primary Examiner* — Mohammad Ali
*Assistant Examiner* — Kelvin Booker
(74) *Attorney, Agent, or Firm* — Norris McLaughlin & Marcus, P.A.

(57) ABSTRACT

A building automation and building information system has a central unit, at least one control unit and first components. The central unit is connected to the at least one control unit via a bidirectional data line, as means for reception of data from the at least one control unit, and means for open-loop and/or closed-loop control of the at least one control unit. Each control unit is associated with at least one first component, to which the control unit is connected by radio. The control unit has means for open-loop and/or closed-loop radio control of the associated first components. The first components associated with each control unit can be con- (Continued)

nected to one another by radio. The central unit, the at least one control unit and the first components each have a plug-and-play capability.

24 Claims, 7 Drawing Sheets

(52) U.S. Cl.
CPC .............. *F24F 2011/0068* (2013.01); *F24F 2011/0071* (2013.01); *H04L 2012/285* (2013.01); *H04L 2012/2841* (2013.01)

(56) References Cited

U.S. PATENT DOCUMENTS

| | | | |
|---|---|---|---|
| 5,611,050 A | 3/1997 | Theimer et al. | |
| 5,916,306 A * | 6/1999 | Ruiz | 709/242 |
| 6,167,316 A * | 12/2000 | Gloudeman et al. | 700/2 |
| 6,173,246 B1 * | 1/2001 | Billups, III | 703/22 |
| 6,192,282 B1 * | 2/2001 | Smith et al. | 700/19 |
| 6,240,326 B1 * | 5/2001 | Gloudeman et al. | 700/83 |
| 6,263,260 B1 | 7/2001 | Bodmer et al. | |
| 6,308,188 B1 * | 10/2001 | Bernardo et al. | 715/234 |
| 6,400,103 B1 * | 6/2002 | Adamson | 315/292 |
| 6,535,110 B1 * | 3/2003 | Arora et al. | 340/12.32 |
| 6,697,880 B1 * | 2/2004 | Dougherty | 719/320 |
| 6,756,998 B1 | 6/2004 | Bilger | |
| 6,901,439 B1 * | 5/2005 | Bonasia et al. | 709/220 |
| 6,967,565 B2 * | 11/2005 | Lingemann | 340/12.23 |
| 7,103,420 B2 * | 9/2006 | Brown | G05B 15/02 |
| | | | 700/23 |
| 7,219,141 B2 * | 5/2007 | Bonasia et al. | 709/220 |
| 7,401,120 B2 * | 7/2008 | Walbeck et al. | 709/203 |
| 7,671,480 B2 | 3/2010 | Pitchford et al. | |
| 8,138,690 B2 * | 3/2012 | Chemel et al. | 315/318 |
| 8,232,745 B2 * | 7/2012 | Chemel et al. | 315/308 |
| 8,239,073 B2 * | 8/2012 | Fausak | G01D 4/002 |
| | | | 700/276 |
| 8,296,408 B2 * | 10/2012 | Anke | G06F 9/5044 |
| | | | 709/201 |
| 8,339,069 B2 * | 12/2012 | Chemel et al. | 315/297 |
| 8,368,321 B2 * | 2/2013 | Chemel et al. | 315/294 |
| 8,373,362 B2 * | 2/2013 | Chemel et al. | 315/297 |
| 8,494,686 B2 * | 7/2013 | Masters | G06F 1/26 |
| | | | 700/292 |
| 8,531,134 B2 * | 9/2013 | Chemel et al. | 315/308 |
| 8,536,802 B2 * | 9/2013 | Chemel et al. | 315/307 |
| 8,543,249 B2 * | 9/2013 | Chemel et al. | 700/295 |
| 8,552,664 B2 * | 10/2013 | Chemel et al. | 315/308 |
| 8,593,135 B2 * | 11/2013 | Chemel et al. | 324/142 |
| 8,610,376 B2 * | 12/2013 | Chemel et al. | 315/308 |
| 8,610,377 B2 * | 12/2013 | Chemel et al. | 315/308 |
| 8,754,589 B2 * | 6/2014 | Chemel et al. | 315/297 |
| 8,805,550 B2 * | 8/2014 | Chemel et al. | 700/22 |
| 8,823,277 B2 * | 9/2014 | Chemel et al. | 315/291 |
| 8,841,859 B2 * | 9/2014 | Chemel et al. | 315/294 |
| 8,866,408 B2 * | 10/2014 | Chemel et al. | 315/297 |
| 9,088,179 B2 * | 7/2015 | Shaffer | H02J 3/14 |
| 2002/0152298 A1 | 10/2002 | Kikta et al. | |
| 2004/0075343 A1 * | 4/2004 | Wareham | H02J 3/14 |
| | | | 307/39 |
| 2004/0260407 A1 | 12/2004 | Wimsatt | |
| 2004/0260427 A1 * | 12/2004 | Wimsatt | G05B 15/02 |
| | | | 700/276 |
| 2004/0267385 A1 * | 12/2004 | Lingemann | 700/83 |
| 2005/0073221 A1 | 4/2005 | Albsmeier et al. | |
| 2005/0116814 A1 * | 6/2005 | Rodgers | H02J 3/14 |
| | | | 340/538 |
| 2005/0192727 A1 * | 9/2005 | Shostak et al. | 701/37 |
| 2006/0009861 A1 * | 1/2006 | Bonasia et al. | 700/18 |
| 2006/0025897 A1 * | 2/2006 | Shostak et al. | 701/1 |
| 2006/0053447 A1 | 3/2006 | Krzyzanowski et al. | |
| 2006/0063522 A1 | 3/2006 | McFarland | |
| 2006/0248208 A1 * | 11/2006 | Walbeck et al. | 709/230 |
| 2006/0253598 A1 | 11/2006 | Nakamura et al. | |
| 2007/0090996 A1 * | 4/2007 | Wang | H04L 67/12 |
| | | | 342/463 |
| 2008/0137572 A1 | 6/2008 | Park et al. | |
| 2008/0186148 A1 | 8/2008 | Kwon et al. | |
| 2008/0205419 A1 | 8/2008 | Shin et al. | |
| 2009/0043441 A1 * | 2/2009 | Breed | 701/29 |
| 2009/0058088 A1 | 3/2009 | Pitchford et al. | |
| 2009/0157957 A1 * | 6/2009 | Fontijn | G06F 12/0888 |
| | | | 711/113 |
| 2009/0267540 A1 * | 10/2009 | Chemel et al. | 315/297 |
| 2010/0070785 A1 * | 3/2010 | Fallin | G08B 13/248 |
| | | | 713/320 |
| 2010/0235654 A1 * | 9/2010 | Malik | G06F 1/3209 |
| | | | 713/300 |
| 2010/0249955 A1 * | 9/2010 | Sitton | F24F 11/0034 |
| | | | 1/34 |
| 2010/0259931 A1 * | 10/2010 | Chemel et al. | 362/249.02 |
| 2010/0262313 A1 * | 10/2010 | Chambers | G05B 15/02 |
| | | | 700/295 |
| 2010/0264846 A1 * | 10/2010 | Chemel et al. | 315/294 |
| 2010/0270933 A1 * | 10/2010 | Chemel et al. | 315/130 |
| 2010/0286937 A1 * | 11/2010 | Hedley | G06Q 30/02 |
| | | | 702/60 |
| 2010/0295473 A1 * | 11/2010 | Chemel et al. | 315/294 |
| 2010/0295474 A1 * | 11/2010 | Chemel et al. | 315/294 |
| 2010/0295475 A1 * | 11/2010 | Chemel et al. | 315/294 |
| 2010/0295482 A1 * | 11/2010 | Chemel et al. | 315/312 |
| 2010/0296285 A1 * | 11/2010 | Chemel et al. | 362/235 |
| 2010/0301768 A1 * | 12/2010 | Chemel et al. | 315/294 |
| 2010/0301769 A1 * | 12/2010 | Chemel et al. | 315/294 |
| 2010/0301770 A1 * | 12/2010 | Chemel et al. | 315/294 |
| 2010/0301771 A1 * | 12/2010 | Chemel et al. | 315/294 |
| 2010/0301773 A1 * | 12/2010 | Chemel et al. | 315/297 |
| 2010/0301774 A1 * | 12/2010 | Chemel et al. | 315/297 |
| 2010/0301834 A1 * | 12/2010 | Chemel et al. | 324/105 |
| 2010/0302779 A1 * | 12/2010 | Chemel et al. | 362/249.02 |
| 2010/0325456 A1 * | 12/2010 | Wendt | H04W 52/028 |
| | | | 713/320 |
| 2011/0001436 A1 * | 1/2011 | Chemel et al. | 315/291 |
| 2011/0001438 A1 * | 1/2011 | Chemel et al. | 315/297 |
| 2011/0046805 A1 * | 2/2011 | Bedros | H04L 12/2809 |
| | | | 700/291 |
| 2012/0010833 A1 * | 1/2012 | Alro | G01D 4/004 |
| | | | 702/62 |
| 2012/0126714 A1 * | 5/2012 | Deppe | H05B 33/0815 |
| | | | 315/192 |
| 2012/0215369 A1 * | 8/2012 | Desai | G06Q 10/06 |
| | | | 700/291 |
| 2012/0235579 A1 * | 9/2012 | Chemel et al. | 315/152 |
| 2014/0114867 A1 * | 4/2014 | Volkmann | G06Q 10/06 |
| | | | 705/308 |
| 2014/0285090 A1 * | 9/2014 | Chemel et al. | 315/131 |
| 2014/0285095 A1 * | 9/2014 | Chemel et al. | 315/152 |
| 2014/0293605 A1 * | 10/2014 | Chemel et al. | 362/249.07 |

FOREIGN PATENT DOCUMENTS

| | | |
|---|---|---|
| DE | 10042969 A1 | 3/2002 |
| DE | 101 09 488 | 9/2002 |
| DE | 10155125 A1 | 6/2003 |
| DE | 102006020030 A1 | 11/2007 |
| EP | 0 319 235 | 6/1989 |
| EP | 1097409 B1 | 5/2001 |
| EP | 1199860 A1 | 4/2002 |
| EP | 1 396 962 | 3/2004 |
| EP | 1802038 A1 | 6/2007 |
| FR | 2852173 A1 | 9/2004 |
| JP | 2000-041079 | 2/2000 |
| JP | 2002368743 A | 12/2002 |
| JP | 2003-084018 | 3/2003 |
| JP | 2003-264880 | 9/2003 |
| JP | 2004-070788 | 3/2004 |
| JP | 2005-234733 | 9/2005 |
| JP | 2006-245829 | 9/2006 |
| WO | 97/44720 A1 | 11/1997 |
| WO | 00/30297 A2 | 5/2000 |

(56) References Cited

FOREIGN PATENT DOCUMENTS

| WO | 01/13185 A2 | 2/2001 |
|---|---|---|
| WO | 01/35544 A1 | 5/2001 |
| WO | 2004/054823 A1 | 7/2004 |

OTHER PUBLICATIONS

Wago, "Building Automation Overview", 2010, Retrieved from the Internet on Oct. 22, 2014 at "www.wago.com".*
Wang, W. and Nova, M., "Wireless Bridges the Technology Gap in Building Automation", Nov. 2003, Industrial Ethernet Book Issue 17/25, Retrieved from the Internet on Oct. 22, 2014 at "www.iebmedia.com".*
Bourgeois, D., "Detailed Occupancy Prediction, Occupancy-Sensing Control and Advanced Behavioural Modelling within Whole-Building Energy Simulation", Jun. 2005.*
Akira Tokumasu, et al., "Development of Energy saving Support System by Ubiquitous Sensors", Proceedings of the 27the Annual Conference of the Robotics Society of Japan (DVD-ROM), Japan, the Robotics Society of Japan, Sep. 15, 2009, pp. 2620-2623.
Screenshot Webseite http://www.e-envir2009.org/?, 2009.
Proceedingsof the European conference of the Czech Presidency of the Council of the EU Towards eEnvironment, Mar. 25-27, 2009.
"Data Mining for Hirarchical Model Creation", Youngblood G. M., Cook D. J.; IEEE Transactions on Systems, Man, and Cybernetics—Part C: Applications and Reviews, vol. 37, No. 4, Jul. 2007.
Design of MyServer: A Residential Server in Smart Home Systems; Wei-Chung Teng, Yu-Chun Pao, Sheng-Luen Chung; IEEE Asia-Pacific Services Computing Conference, 2008, APSCC'08, Dec. 9-12, 2008, Seiten 580-586.
Wireless ad-hoc control networks; Bu, S & Naghdy, F; 3rd IEEE International Conference on Industrial Informatics (INDIN '05), Aug. 10-12, 2005, 839-844.
Bericht zum Projekt "SmartHouse/SmartGrid" der Europäischen Kommission; "Deliverable 2.1: In-house architecture and interface description" veröffentlicht am Jun. 5, 2009.
Bericht zum Projekt SmartHouse/SmartGrid der Europäischen Kommission; "Deliverable 1:2: Technology Trends for SmartHouse/SmartGrid" veröffentlicht am Feb. 2, 2009.
Auszug aus dem Buch Jennifer Bray: Bluetooth 1.1: connect without cables Prentice Hall PTR; 2002.
Artikel "UPnP ForumSM Celebrates Ten Years of Leading Connectivity Innovation" veröffentlicht am Oct. 19, 2009.
"Implementing ZigBee Wireless mesh networking", Industrial Automation, 2005.
Smart Home at a Finger Tip: OSGi-based myHome; Huang, H.-Y., Teng W.-C., Chung S.-L.; IEEE International Conference on Systems, Man, and Cybernetics, San Antonia, TX, USA, Oct. 2009.
"A new architecture for Reduction Energy Consumption of Home Appliances"; Capone A., Barros M., Hrasnica H., Trompors S., Towards eEnvironment, Prag, CZ, Mar. 25-27, 2009.
Screenshot Webseite http://www.e-envir2009.org/?programme1; Programm der Konferenz "Towards eEnvironment", heruntergeladen auf Webseite D16a, 2009.
ELV Elektronik Hauptkatalog 2008.
Schnellstartanleitung HomeMatic Zentrale CCU1, HM-Cen-3-1, Feb. 2008.
Montage- und Bedienungsanleitung Funk-Stellantrieb HM-CC-VD, Apr. 2008.
System architecture and implementation of a CEBus/internet gateway (Desbonnet and Corcoran; IEEE Transactions on Consumer Electronics, vol. 43, No. 4, S. 1057-1062, Nov. 1997).
Browser-Style interfaces to a home automation network (Desbonnet and Corcoran; IEEE Transactions on Consumer Electronics, vol. 43, No. 4, S. 1063-1069, Nov. 1997).
Mapping home-network appliances to TCP/IP sockets using a three tiered home gateway architecture (Corcoran; IEEE Transactions on Consumer Electronics, vol. 44, No. 3, S. 729-736, Aug. 1998).
Wireless technologies in home and building automation (Reinisch, Kastner, Neugschwandtner, Granzer; 1-4244-0865-2/07; IEEE 2007, S. 93-98), 2007.
An adaptive network architecture for home- and building environments; Kistler, R., Knauth, S., Klapproth, A.; IEEE International Conference on Emerging Technologies and Factory Automation, ETFA 2008, Sep. 15-18, 2008, Seiten 295-302.

* cited by examiner

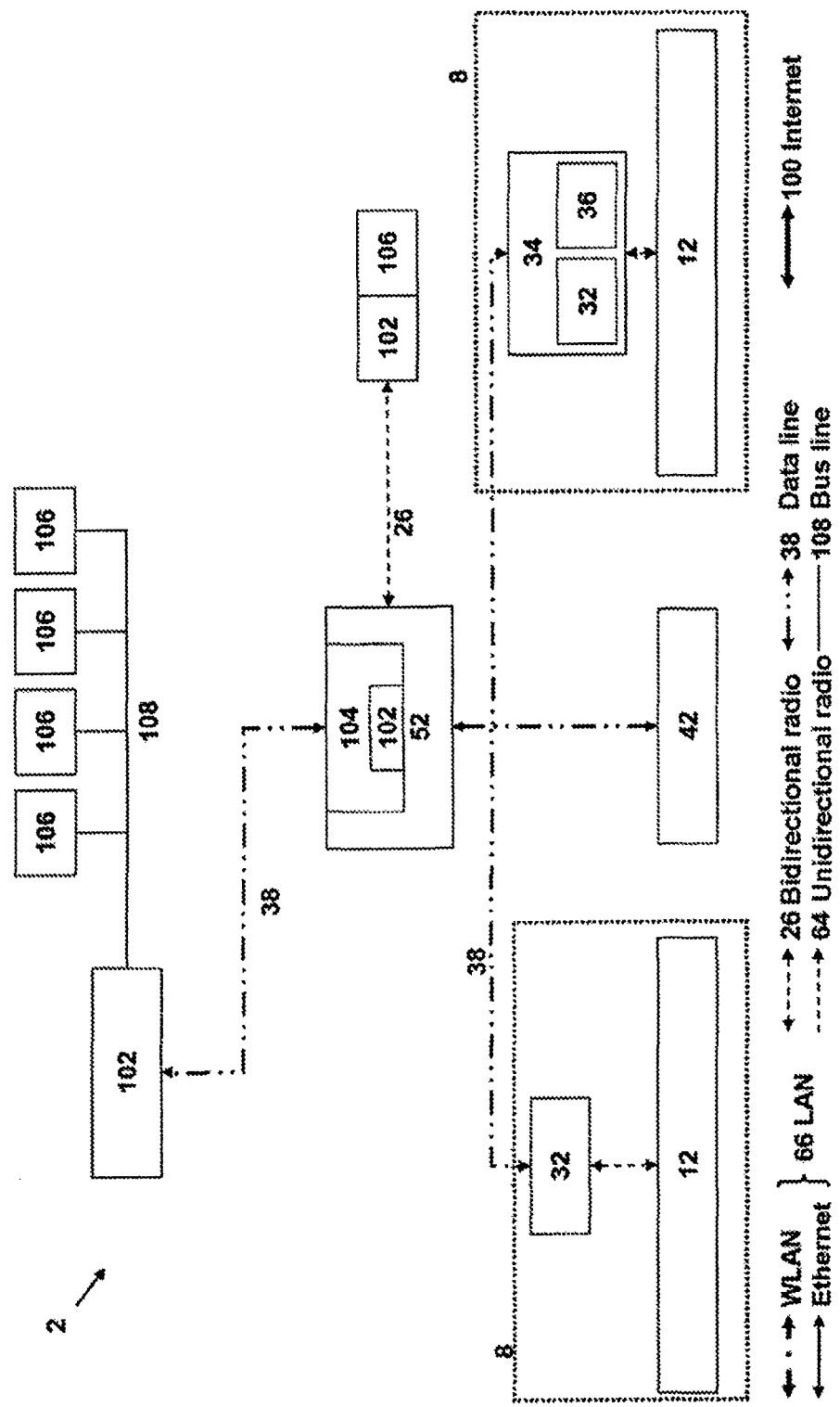

BUILDING AUTOMATION AND BUILDING INFORMATION SYSTEM

BACKGROUND OF THE INVENTION

The invention relates to a building automation and building information system.

Various systems for building automation and/or building information are known from the prior art. Systems such as these frequently use bus systems for networking of the individual components. DE 35 14 334 A1 discloses a building control system having an information transmission system which is in the form of a bus system and to which sub-information transmission systems are connected. These sub-information transmission systems are connected to the information transmission system via coupling points, with the coupling points being designed such that the only information which is interchanged between the individual transmission systems is that which is intended for the respective other system. The topology of the building control system with blocks between the information transmission system and the sub-information transmission systems reduces the data traffic in the individual transmission systems.

Furthermore, DE 101 09 488 A1 discloses a building control system for open-loop control, closed-loop control and/or monitoring of states in a building which is subdivided into rooms. The building control system has converters which are fitted in a stationary form in the rooms and are connected to one another via a bus line. Each converter is associated with a radio network which covers one of the rooms. Subdivision of the network into one wire-based network and a plurality of radio networks is intended to provide flexibility for low-level installation complexity.

EP 0 319 235 A2 discloses a data and power control system for a building. This automated system has an application data coordination network, a high-power data network, power distribution means, means for transmission of analog data and means for transmission of video services. Various regional control units in the building are connected to one another via the high-power data network, and data can also be interchanged with devices outside the building. The high-power data network is preferably designed using a "token ring" architecture. The individual regional control units are connected via application data coordination networks to various applications, such as switches, sensors and control units. The regional control units monitor and coordinate the operation of the applications. An application data coordination network is preferably connected, as a bus line, to the regional control unit.

SUMMARY OF THE INVENTION

The building automation and building information systems known from the prior art have the disadvantage that the installation and setting-up of the system are complex, and generally have to be carried out by an installer. When using known bus systems, a large amount of programming-complexity is also required, in order to allow address-control communication between individual components. Furthermore, the system architectures known from the prior art are not very flexible and are designed specifically for the intended purpose. Changes to the building information system, such as upgrades to the system, are invariably associated with a large amount of effort, or are completely impossible. In the case of bus systems, all the subscribers or nodes are preferably arranged in a line topology as authorized subscribers, with the data traffic being organized using an addressing process.

The object of the present invention is therefore to provide a building automation and building information system with a system architecture which can be used flexibly for different applications. A further aim is to minimize the installation effort and the effort involved in modifications to the system.

The building automation and building information system according to the invention contains a central unit, at least one control unit and first components. The central unit, which is connected to the at least one control unit via a bidirectional data line, has means for reception of data from the at least one control unit, and means for open-loop and/or closed-loop control of the at least one control unit. Each control unit has at least one associated first component, to which the control unit is connected by radio. The control unit has means for open-loop and/or closed-loop radio control of the associated first components. The first components associated with each control unit can be connected to one another by radio. The central unit, the at least one control unit and the first components have a plug-and-play capability. In this case, the expression plug-and-play capability, which is used and known in the specialist field, in this case is understood as meaning that a module provides its function when integrated in the system, and is possibly in the form of a so-called plug-in.

The building automation and building information system according to the invention has a system architecture with different hierarchy levels. Various components are arranged at an appliance level, the lowest level in the system architecture. By way of example, these components include electronic components with electrical appliances arranged in a dwelling room, which are directly or indirectly networked via the building automation and information system. The appliance level may, for example, include switches or pushbuttons, sensors or actuators. By way of example, these components are used for room lighting, room temperature control and air conditioning, room security or for opening and closing windows, roller shutters, etc. In this case, the components include a radio module, via which they can be linked to the building automation and building information system. Electrical appliances which do not have a radio module such as this may, for example, be linked indirectly to the building automation and building information system by the power supply to this electrical appliance being switched, or provided with open-loop or closed-loop control, via an upstream actuator such as a relay or a semiconductor circuit.

In this case, the components preferably have energy harvesters for supplying power. By way of example, energy harvesters convert energy from temperature differences, light or pressure to electrical energy, which is used to supply the respective components. These components may additionally have an energy store, as a result of which electrical power is also available when no primary energy for conversion is available. The combination of radio technology and the technology of energy harvesters allows components such as switches, pushbuttons, sensors and/or actuators to be positioned freely in the room, without them having to be connected to a power supply line, and therefore to the building electrical mains system.

Low-power Standards with low power consumption, such as ZigBee or EnOcean Dolphin, are preferably used as the radio standard at the appliance level. The individual components can communicate with one another via these radio signals. By way of example, a pushbutton can thus send a radio signal to an actuator which switches on the room lighting. The components are also connected to the superordinate level in the building automation and building information system, for example the room level, via the radio standard that is used. In this case, components which are functionally linked to one another, for example the components in a dwelling room, are associated with a control unit for the superordinate room level.

Components associated with the control unit are switched, monitored and/or subjected to open-loop or closed-loop control via the control unit. A function such as this is preferably implemented as a function of time, of a nominal value or of the user, and this can be stored in the form of different profiles in the control unit. A further room function, which can preferably be regulated via the control unit, is a conditional switching process of an actuator. When a switch or pushbutton is operated, it sends a radio signal to the control unit. The control unit does not send a radio signal to the actuator unless a predefined condition is satisfied. By way of example, a condition such as this is a brightness level being undershot in a room in which the lighting is intended to be switched on. However, an actuator such as this can also be operated just by the condition being satisfied, without a switch having previously been operated.

The control unit preferably has a user interface. A user interface such as this is, for example, a touch-sensitive touchpad with a plurality of pushbuttons, a so-called multiple keypad. Individual pushbuttons or areas of the touchpad are in this case associated with specific functions. Furthermore, the user interface is preferably in the form of a touch-sensitive display. Graphics user interfaces can additionally be displayed on the display. The room functionalities can be displayed in a stylized or generic form via the touch-sensitive display. In this case, the graphics display of the interface is automatically generated on the basis of the identified components and/or functions, which have been associated with the control unit. By way of example, the graphics display can be changed by a menu for the touch-sensitive display. Furthermore, it is possible to change settings, such as parameters of the individual profiles. Different room functionalities can therefore be activated or programmed via the touch-sensitive display, which settings are stored in the control unit, or are implemented by it. Furthermore, state data such as the current room temperature or consumption data such as the energy consumption by components associated with the control unit can be displayed on the control unit.

Furthermore, the control unit contains communication modules by means of which the control unit can be networked with further control units in the same hierarchy level. The control unit is additionally connected to a superordinate central unit via this communication module. The communication via the communication module is preferably line-based. In a preferred layout one of the control units is integrated in the central unit. Furthermore, the electrical mains system lines are preferably used as the communication medium. By way of example, a 230V mains line can be used for data communication, via suitable communication modules. In this case, it is particularly preferable to use data transmission based on the Powerline Command and Control Standard, which has the necessary robustness for data transmission. When using the 230V electrical mains system, a system such as this can be installed without major installation effort. An embodiment such as this is particularly advantageous when a building automation and information system such as this is installed in an already existing building. In this case, there is no need to lay additional lines.

If the 230V electrical mains system is used, the central units and control units can additionally be supplied with power via the data lines.

However, alternatively, it is also possible to use other data lines, such as Ethernet cables. It is also possible to configure the communication at room level or with the superordinate levels via a radio link, such as WLAN. In this case, WLAN is considered to be one embodiment of an LAN link.

The dwelling level, which is superordinate to the room level with the control unit, contains at least one dwelling central unit. In the case of a single-family house, or an individual automated dwelling, this is the uppermost hierarchy level in the system architecture. However, in the case of multiple-family buildings, it may be worthwhile to arrange a plurality of dwelling central units in parallel on one level, with a building central unit being superordinate to the dwelling central units. The functionality of the central unit is therefore split between different central units, in which case authorizations can be allocated for access to specific data. Identical transmission formats and transmission media are preferably used for data communication at the dwelling level or between the dwelling level and the building level as that at the room level or between the room level and the dwelling level. However, it is also possible to use different transmission media.

Central functions at the respective level are switched, monitored or subjected to open-loop or closed-loop control by the central units. By way of example, the consumption meters for the dwelling are connected to the dwelling central unit, and the consumption meters for the building are connected to the building central unit. Furthermore, open-loop control can be provided for building central heating by the building central unit. For this purpose, the building central unit receives the relevant data from the individual dwelling central units, on whose basis the building central unit acts on the heating control system. A communal cost bill can be created on the basis of the consumption data of the building and that of the individual dwelling units.

A central unit preferably has a database in which state data and/or consumption data can be stored. The respective central unit preferably receives only the data which is relevant for it, and stores this in the database. By way of example, measured consumption data of individual appliances is relevant only for the respective dwelling central unit, but not for the building central unit. Only the total consumption of a dwelling is relevant for the building central unit to produce the communal cost bill, but not the consumption of individual appliances. The consumptions of individual appliances can be read directly via the dwelling central unit. Furthermore, the parameters of the control profiles for the building automation and building information system are stored in the database.

The database is also used to store state changes, such as lighting being switched on or detection of movement by a movement sensor, together with a time stamp in the database. The instantaneous state of the building automation and building information system, as well as a data history, can therefore be called up from the database. The stored state data and consumption data can be used to draw conclusions about the consumption behavior of the occupants of a building or of a dwelling in a building. State data and consumption data in the database can be used for adaptive matching of the control of the building automation and building information system to the user behavior.

In a first step of adaptive matching of the open-loop and closed-loop control of the building automation and building information system, specific events can be linked to predefined consequences. For example, one such event is represented by the selected wake-up time for a wake-up facility which is linked to the building automation and building information system. By way of example, defined consequences may be that sufficient hot water for showering should be available at the wake-up time. The heating system therefore starts to heat up the water even before the wake-up time. Furthermore, certain rooms, such as the bathroom, can be heated to a specific temperature via the heating system, which is preferably in the form of central heating. Furthermore, certain electrical appliances, such as a coffee machine, can be switched such that they are available immediately without an occupant having to wait for the warming-up process or the coffee preparation process. After a change in the wake-up time, the corresponding control processes and switching-on processes for the relevant components are automatically adapted to the new wake-up time.

In a second adaptation step, the values stored in the database relating to the consumption behavior and the user behavior are evaluated. The open-loop and closed-loop control in the building automation and building information system is matched to the user behavior on the basis of these values. By way of example, the hot water consumption meter is used to determine what amount of hot water is required at what times. The heating control can be adapted to the user behavior for water heating on the basis of this data, thus avoiding a large amount of hot water being available all the time. Conclusions relating to the use of individual rooms or the entire dwelling, or the entire building, can furthermore be drawn, for example, from movement sensors installed in the rooms. Individual rooms or else the entire dwelling, or the entire building, can then be heated via the central heating on the basis of this data only when the corresponding rooms are being used. By way of example, the central unit can also determine times when there is normally nobody in the dwelling or in the building and there is therefore no need for temperature control for the rooms, or only a limited extent. The building automation and building information system controls the central heating system on the basis of the normal time at which somebody returns to the rooms or, by way of example, from work, such that the desired room temperature is reached when or shortly before the person returns. This allows energy-optimized room temperature control.

The degree of adaptation can preferably be chosen freely by the user between 0% and 100%. For a 0% adaptation degree, the stored control profiles are not changed, and are not matched to the user behavior. For a 100% adaptation degree, the control profiles are matched precisely to the user behavior, by means of an algorithm. This can be explained using, for example, the control of the hot water supply. It is possible to tell from the consumption data recorded over a relatively long time period that, for example, 50 liters of hot water is required for showering at 7 o'clock on weekdays. By way of example, a basic profile is set for control of the hot water supply such that 200 liters of hot water is available all the time. If the adaptation degree is 0%, then nothing is changed with regard to this basic profile. With a 100% adaptation degree, the system produces precisely 50 liters of hot water at 7 o'clock. No new hot water is produced throughout the rest of the day. For an adaptation degree of 50%, for example, a hot water supply of 50 liters is kept available throughout the entire day. Further intermediate values, which are produced by an adaptation algorithm, result in a continuously variable change in the adaptation degree between 0% and 100%. The degree of adaptation can preferably be selected using a slide regulator or a rotary wheel. A slide regulator or a rotary wheel such as this can in this case also be displayed by software using the touch-sensitive display. It is also possible to implement an energy-saving mode, which can be operated centrally. When a function such as this is activated, only components and appliances which can be defined in advance and represent a necessary basic supply are supplied with electricity.

An adaptation process such as this is preferably implemented in the central unit. The central unit carries out the adaptation on the basis of the consumption data and user data, which are stored in the database in the central unit. In this case, the control profiles are updated on the basis of data that is newly stored in the database. The newly generated control profiles are used to control components directly from the central unit, or the adapted parameters are passed to the control unit, which controls the corresponding components.

The central unit or the database in a central unit is preferably accessed via a user interface. The user interface is preferably a PC with appropriate software which can be connected to the central unit via, for example, an LAN cable or a WLAN link. The parameters of the building automation and building information system as well as the consumption and state data can be called up from the database via a PC such as this. Furthermore, the central unit is preferably connected to a web server. The central unit can thus be accessed via the Internet. This is done, for example, via a graphics interface, which is produced in an Internet browser by the web server. One advantage of a web server such as this is that the central unit can be accessed from any Internet-compatible appliance, such as a mobile telephone, Notebook or PDA. Furthermore, there is no need to install system-specific software in the Internet-compatible appliance. By way of example, the central unit can therefore also be accessed from an external PC. It is also possible to access the central unit via the Internet using specific software. The operation of the system can be checked, and open-loop or closed-loop control parameters can be varied, even when away, by the capability for remote access via the Internet.

In addition, further components are preferably linked to the communication medium between the control unit and the central unit. A configuration such as this is advantageous, for example, for a central function which is not associated with any of the control units. By way of example, central functions such as these are the heating control system or the control of outside systems. Furthermore, those further components which do not have a radio module which is used at the appliance level are preferably also linked to the system in the manner described above. For example, for a switchable plug socket which is connected to a 230V electrical mains system, it is thus possible to communicate with the control unit via an appropriate communication module, using the 230V mains supply line. For software purposes, a plug socket such as this is preferably functionally associated with one specific control unit. A further possibility is, for example, to equip an electrical load which has a mains plug with a communication module for communication via the mains supply line. These components preferably have input and output devices for controlling them.

It is also possible to connect further components to a control unit by radio, without these components being functionally associated with the control unit but that these components represent a central function. This is advantageous, for example, for autonomous-energy sensors using energy harvesting technology. The radio transmission path is thus reduced since this can be connected to the closest control unit, or it is even possible to avoid a cable-based communication interface. For example, an outside temperature sensor can be connected in this way to a control unit, and therefore indirectly to a central unit.

The building automation and building information system preferably has a universal network interface, by means of which the building automation and building information system according to the invention can be coupled as a subsystem to other subsystems such as different appliances and components, as well as networks thereof or complete building automation and building information systems. This therefore allows communication with other subsystems which are not designed for the building automation and building information system according to the invention.

In order to allow such communication, each of the subsystems has an appropriate universal interface. The universal interfaces of the individual subsystems are connected to one another via a central computer. The central computer is, for example, in the form of a microcontroller, a so-called SoC (System-on-a-chip) or a conventional PC-CPU which, in particular, is arranged in a server. The central computer has an apparatus for management of data structures, in particular in the form of databases, in which the functionalities of the respective subsystems as well as the state data of the individual appliances are defined and stored, preferably in abstract form. By way of example, the instantaneous state parameters for a light source, such as "on" or "off", and possibly the dimming level, are defined and stored. The appliances and components can in this case be subdivided into functional groups. By way of example, specific appliances and/or functions of various appliances which are intended to be operated jointly can be combined in one such functional group. The appliances and functions in a functional group need not be in the same subsystem, that is to say they need not be associated with the same interface. One appliance can be associated with different functional groups or one appliance can also be assigned different functional groups, respectively.

The appliances and components are preferably stored with the functional groups with which they are associated, and their state data, in the data structure of the central computer. Some components and appliances, for example, have the state parameters "on" or ""off", or "0" or "1". Other appliances, like the light source described above, with a dimming actuator, have a discrete number of intermediate values, in addition to the state parameters "on" or "off", or "0" or "1". Various state parameters are therefore stored for the respective appliance, corresponding to its functionality. Furthermore, the address at which the appliance can be accessed in the overall system is stored in the database. For example, the universal interface which is associated with the appliance is also stored.

Furthermore, the central computer has apparatuses for communication with the universal interfaces in the subsystems. In this case, commands and state data can be synchronized between the subsystems and the central database of the central computer, by means of a special protocol. In this case, the protocol is specified for the respective subsystem, in order to translate the state data to the abstract form of the central database. This central computer therefore creates a basis via which different subsystems can communicate with one another, without the respective subsystem knowing the commands and/or state parameters of the other subsystem. Only a protocol for conversion of the commands and the state data to a native language of the central computer is implemented. This protocol is preferably implemented in the central computer, but can also be executed in the network interface. In this case, by way of example, the subsystem and the central computer are synchronized cyclically or as required, in particular as a result of a state change.

The central computer can be connected to the universal interfaces in various ways. In one embodiment, by way of example, a serial data bus can be used as a type of connection, in accordance with the $I^2C$ (Inter-Integrated Circuit) or SPI (Serial Peripheral Interface) Standard, or a parallel data bus. Alternatively, the central computer and the universal interface can be coupled via further known types of connection which, for example, also allow a connection via public data lines such as the telephone or cable network, or radio networks such as WLAN or the mobile radio network.

The central computer can preferably be integrated in one of the universal interfaces. For example, the function of the central computer with the database and the universal interface can be carried out by the central unit or the control unit. All the data lines of the building automation and building information system, such as radio, (W)LAN, the Internet or the electrical mains system are preferably available to the central unit as coupling paths to other universal interfaces.

A universal interface such as this allows the building automation and building information system to be integrated in various ways in a system architecture of the overall system, comprising various subsystems. In a first refinement, appliances and components which are not compatible with the central computer and the universal interface can be integrated via the central unit in the building automation and building information system. In this case, it is irrelevant for the type of connection and the system architecture whether a plurality of components are connected, for example, via a bus system to a universal interface, whether the component itself contains the universal interface, or whether the components cope with the native language of the central computer. In a further refinement, the building automation and building information system according to the invention is configured as a subsystem at the same level or as a subordinate subsystem of another, incompatible, building automation and building information system.

The described system architecture makes it possible to access any control unit and/or component of the system via the central unit, to call up data, to evaluate it and to provide open-loop or closed-loop control for the components. In this case, the system is preferably designed such that commands from a superordinate level are dominant and are passed to the relevant subordinate elements in the system. In addition, for example, access is preferably made from a subordinate level, for example the control unit with a touch-sensitive display, to the data which is stored in the central unit database. One important precondition for this is preferably the allocation of access rights, in order that only respectively released data can be called up and/or amended.

The various views for the graphics user interfaces, such as a PC or a touch-sensitive display of the multifunction unit, can be adapted on a user-defined basis. All the connected control units with the associated components, all the connected further components and the connected consumption meters can be read from the dwelling or building central unit via the PC. In this case, the system architecture is read at the same time. The software allows amendments to be made to the system architecture, such as the association of components with other control units, and switches can be reconfigured by being associated with a different actuator. Furthermore, different graphics representations of the functions can be generated, for example on the touch-sensitive display. A room or a dwelling is preferably imaged in stylized form. The various components as well as the associated control unit can be visualized in graphics form on the basic outline.

The respective functions and control parameters can be called up and amended by calling up individual components on the display.

A further possibility is to provide services, for example from the system manufacturer, aligned specifically with the building automation and information system. By way of example, services such as these include automatic updating services for the software of individual modules. The software updates are in this case carried out automatically or on instruction. The various user interfaces of the system can be used for the instruction for software updating. A server which is connected via an Internet link, or alternatively a data storage medium connected to the system, such as a USB stick or the hard disk of a PC, is preferably used as a data source.

In addition to the updates, open-loop or closed-loop control programs can be created for the system and/or can be applied in the building automation and building information system by the user himself. Additional functions or modules can thus be integrated in the system. To this end, it is particularly advantageous for computer software with a graphics user interface to be provided for creating the so-called plug-ins. By way of example, individual predefined software modules are preferably linked to operators for this purpose. Furthermore, however, already existing plug-ins from other users or appliance manufacturers can also be integrated.

A further important aspect for simple installation of the system is the plug-and-play capability of the individual modules. In this case, when being integrated in the system, a module transmits its functions and, if appropriate, provides a so-called plug-in, by means of which it is accessed from a superordinate control unit and/or central unit. The UPnP Standard is preferably used as the plug-and-play Standard. In this case, and in particular, the components, the control unit and the central unit or units have a plug-and-play capability.

It is furthermore possible for the central unit to be connected to an external service level via the Internet link. A service level such as this provides various services and functions. For example, relevant data for consumption cost billing can be transmitted via the Internet link to an external service provider. Such a transmission is preferably in the form of a push service, which transmits the required data/information to the external service provider at a predefined time.

The building automation and building information system is distinguished in that it can be flexibly matched to widely different applications. On the one hand, the system can be upgraded and adapted without a large amount of installation effort. For example, components can thus easily be linked to a room via a control unit. Furthermore, new rooms can also be integrated in the building automation and building information system, by linking new control units and components. Furthermore, the system can be upgraded by combining a plurality of (dwelling) central units by means of a new, superordinate (building) central unit. In this case, the individual (system) components can easily be integrated, because of the variability in the choice of the type of connection. A radio link is preferably used for autonomous-energy components, and a connection based on electrical lines is preferably used for components which require an electrical connection. On the other hand, flexibility exists in the choice of the components. Depending on the equipment of the components, these components can be integrated in the building automation and building information system via the various interfaces. Furthermore, the use of a plug-and-play Standard provides a universal interface for the linking of components. Furthermore, the control of the components, such as the heating control system, can be individually adapted via the plug-ins. By way of example, component manufacturers can make their components compatible with the building automation and building information system by means of plug-ins or appropriate configuration of the plug-and-play interface for the components. The building automation and building information system can therefore be considered to be flexible from two points of view: with respect to the system architecture and with respect to the choice of the components.

BRIEF DESCRIPTION OF THE DRAWINGS

Further features and advantages of the invention will become evident from the following exemplary embodiments, in conjunction with the figures, in which:

FIG. 7: shows a building automation and building information system as shown in FIG. 1, with components which are integrated via a universal interface.

DETAILED DESCRIPTION OF THE INVENTION

Figure 1:
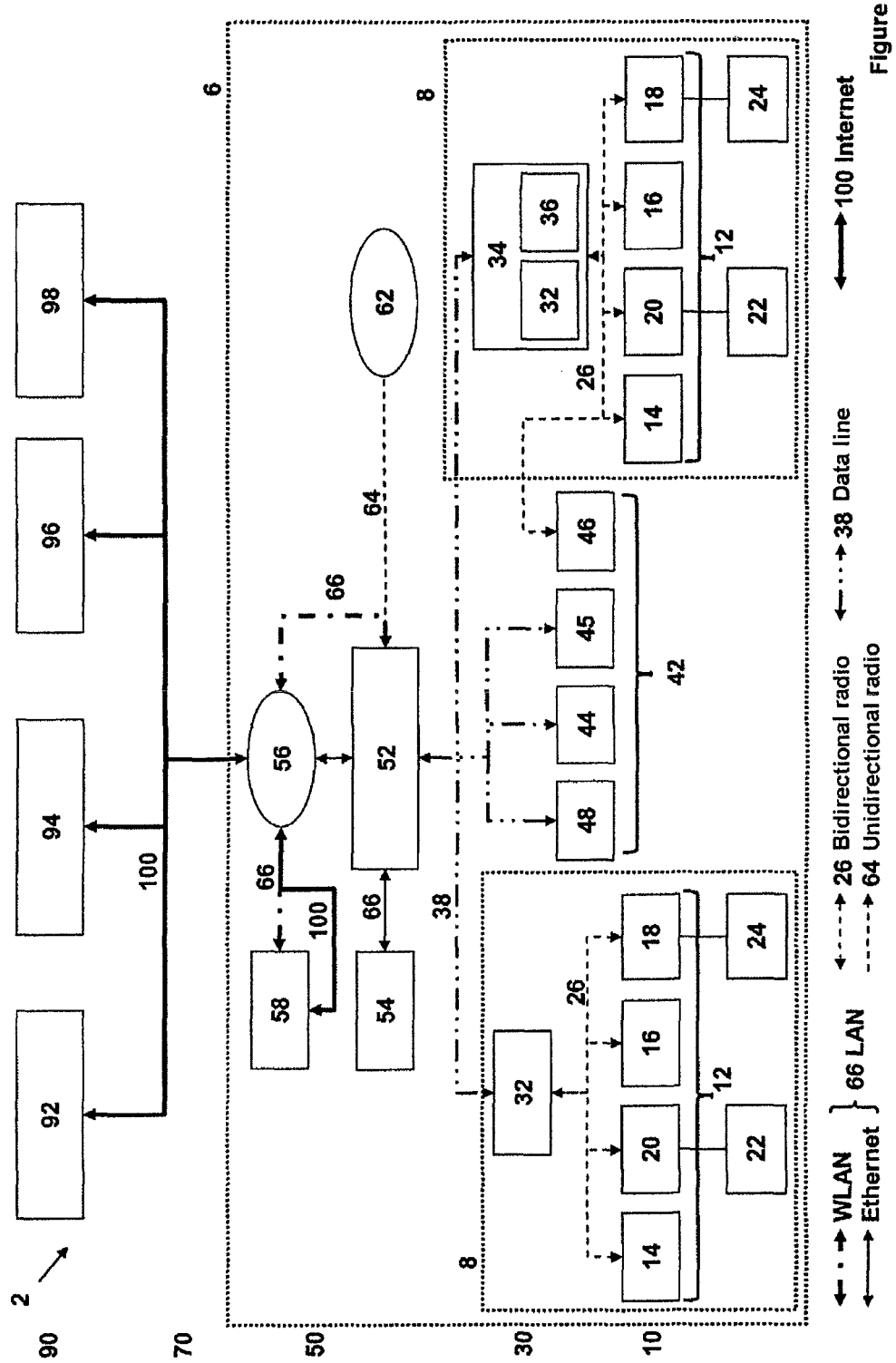
FIG. 1: shows a first embodiment of a building automation and building information system.

FIG. 1 shows the system architecture of a building automation and building information system 2 according to the invention, with various hierarchy levels. Components 22 in a room 8 are arranged at the appliance level 10 and are connected to the building automation and building information system 2. These components 12 are in the form of switches 14, sensors 16 or actuators 18. Some of the components 12, such as a specifically designed plug socket 20, contain both sensors 16 and actuators 18. The plug socket 20 thus switches or regulates the connected load 22 as well as recording the consumed power. Various appliances 24 in a building are operated via the actuators 18. Lamps, heaters, doors, windows and roller shutters are considered to be appliances 24. The components 12, in particular switches 14 and room sensors 16, have energy harvesters as energy source. These components 12 can therefore be placed freely in a building 4, without complex wiring.

The individual components 12 each have a radio module for communication via a unidirectional or bidirectional radio link 26. The individual components 12 communicate with one another via the radio link 26. For example, signals are sent unidirectionally from the switch 14 on the basis of which an actuator 18, which is in the form of a relay, switching on the lighting. The highly energy-efficient radio standards EnOcean Dolphin and ZigBee are used for the radio link 26. The components 12 likewise communicate with the superordinate room level 30 via the bidirectional radio link 26. In this case, the components 12 which are arranged in a room 8 in a dwelling 6 are associated with a control unit 32. The control unit 32 has a control system for coordination, as well as a monitoring function for the individual components 12. Furthermore, profiles which are a function of time and of the user are stored and executed via the control unit The control unit 32, which is in the form of a multifunction unit 34, additionally has a touch-sensitive display 36. Individual room functions can be accessed directly via this touch-sensitive display 36. The multifunction unit 34 therefore includes the functions of a switch 14, in particular of a pushbutton, with the switch area of the touch-sensitive display 36 being individually matched by software to the components 12 in the room. Furthermore, information such as the room temperature or energy consumption can be called up via the touch-sensitive display 36. In addition, the parameters of the building automation and building information system 2, such as the desired room temperature, can be varied.

The various control units 32 which are arranged in a dwelling 6 are connected to one another via a Powerline system. In a Powerline system, data is transmitted bidirectionally via the 230V electrical mains system. This is done using the "Powerline Command and Control" Standard. Because the 230V electrical mains system is used as a data line 38, there is no additional installation effort for laying wiring. The individual control units 32 are connected via the data line 38 at the dwelling level 50 to the dwelling central unit 52, which is arranged hierarchically above it. The dwelling central unit 52 controls, coordinates and monitors the individual control units 32.

Further components 42, such as a heating controller 44, which are not directly associated with a room, are connected directly via the data line 38 to the dwelling central unit 52. If the further components 42, such as an autonomous-energy outside temperature sensor 46, do not need to be connected to the data line 38, then these components 42 are connected indirectly to the dwelling central unit 52 via the multifunction unit 34. Furthermore, the further components 42 also include a plug socket 48, which is connected to the data line 38 as a result of which no additional radio module is required. A plug socket 48 is connected to and associated with the control unit 32 via the data line 38. A washing machine 45, which has a Powerline communication module, is connected to the dwelling central unit 52 via the data line 38.

Consumption meters 62 are connected to the dwelling central unit 52 via a unidirectional radio link 64 using the Wireless M-Bus Standard. The driving central unit 52 therefore records the consumption data of electricity, water and gas for the entire dwelling 6 via the consumption meter 62, as well as via the sensors 16 that are relevant for consumption recording in a room 8, and stores this data.

The dwelling central unit 52 can be connected to a PC 54 via a LAN link 66. The LAN link 66 may be both a wire-based link and a radio-based link. The PC 54 has software by means of which system data such as consumption data or instantaneous state data can be called up via the building automation and building information system 2. Furthermore, parameters such as the desired room temperature in individual rooms 8 can be varied via the PC 54. The dwelling central unit 52 is also connected to a first DSL router 56 via a LAN link 66. This first DSL router 56 also includes a web server, which provides a graphics user interface for calling up system information and for amending system parameters by means of an Internet browser. System information can therefore be called up and system parameters can be varied via a PC/mobile telephone 58, without additional software being installed on the PC/mobile telephone 58. The connection between the PC/mobile telephone 58 and the first DSL router 56 is set up either internally as a LAN link 66, or externally as an Internet link 100.

The dwelling central unit 52 is connected to a service level 90 via the DSL router 56. The service level 90 relates to external services which are communicated with via an Internet link 100. A first service relates to customer services 92. The customer services 92 include maintenance services which can be connected to via an emergency call button on the multifunction unit 34, or security services, which are alarmed by sensors 16. Furthermore, the service level 90 preferably has energy supply services 94. These are services relating to the supply of power to the dwelling 6. By way of example, meter readings are in this way transmitted to the energy supplier or to a service provider, who creates an energy cost bill, or calls up present energy tariffs, in particular time-dependent energy tariffs, from the energy supply company. Furthermore, electricity consumption data is transmitted to the energy supplier who uses this to create predictions of the electricity consumption on the basis of the consumption behavior. These predictions are used to optimize electricity purchasing and electricity production. Furthermore, the service level 90 comprises servicing services 96 such as weather forecast from Internet services, which are used for heating control.

A further possibility is to provide specific services for the building automation and information system, for example from the system manufacturer, so-called DEMS Services 98. Services 98 such as these may include, for example, automatic updating services for the software for individual modules (dwelling central unit 52, control unit 32 or components 12, 42). The software updates are carried out automatically. A manufacturer server which is connected via an Internet link 100 is used as the data source for the software updates. Furthermore, system or appliance faults are transmitted via such services 98 to the manufacturer, and remote diagnoses or remote servicing is carried out.

Figure 3:
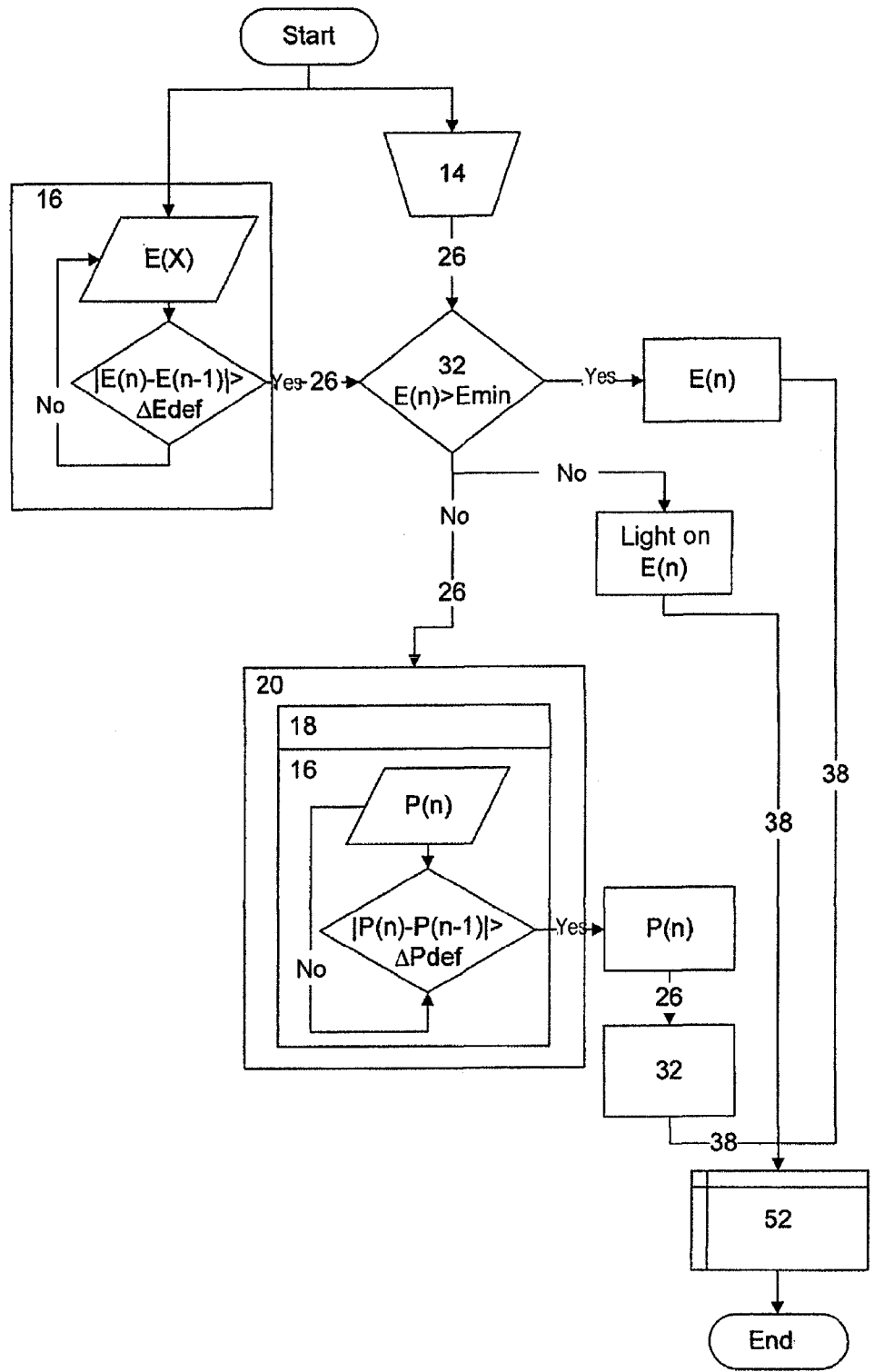
FIG. 3: shows a block diagram of an actuator operating process.

FIG. 3 shows an operating process for an actuator 18 using the example of a lighting device, in the form of a block diagram. This relates to a process of switching on a lighting device which is linked to a condition. When the light switch 14 is operated, this sends a signal via the radio link 26 to switch the lighting device on. This signal is received by the control unit 32.

Furthermore, a sensor 16 for determining the room brightness $E(x)$ is arranged in the living room 8. If the value of the room brightness $E(x)$ changes, the sensor 16 sends a radio signal 26 with a corresponding value $E(n)$ to the control unit 32. The control unit 32 compares the most recently received value $E(n)$ for the room brightness $E(n)$ with a predefined threshold value $E_{min}$. If the room brightness $E(n)$ is greater than the predefined threshold value $E_{min}$, the control unit 32 sends the most recently received value for the room brightness $E(n)$ via the data line 38 to the dwelling central unit 52, where this value is stored in the database. If the most recently received value for the room brightness $E(n)$ is lower than the predefined threshold value $E_{min}$, then the control unit 32 sends a signal for switching the lighting device via the radio link 26 to the actuator 18 for switching and dimming the lighting, which actuator 18 is in the form of a semiconductor circuit. Furthermore, the control unit 32 sends the instantaneous value for the room brightness $E(n)$ as well as the message "light on" to the dwelling central unit 52, which stores these values in the data base.

The actuator 18 closes the circuit, as a result of which the lighting is switched on. Furthermore, a sensor 16 for measurement of the electrical power measures the electrical power P(n) consumed by the lighting device. This value is transmitted by the radio link 26 to the control unit 32, and further above the data line 38 to the dwelling central unit 52, where the consumption data is stored in a consumption data base.

Figure 4:
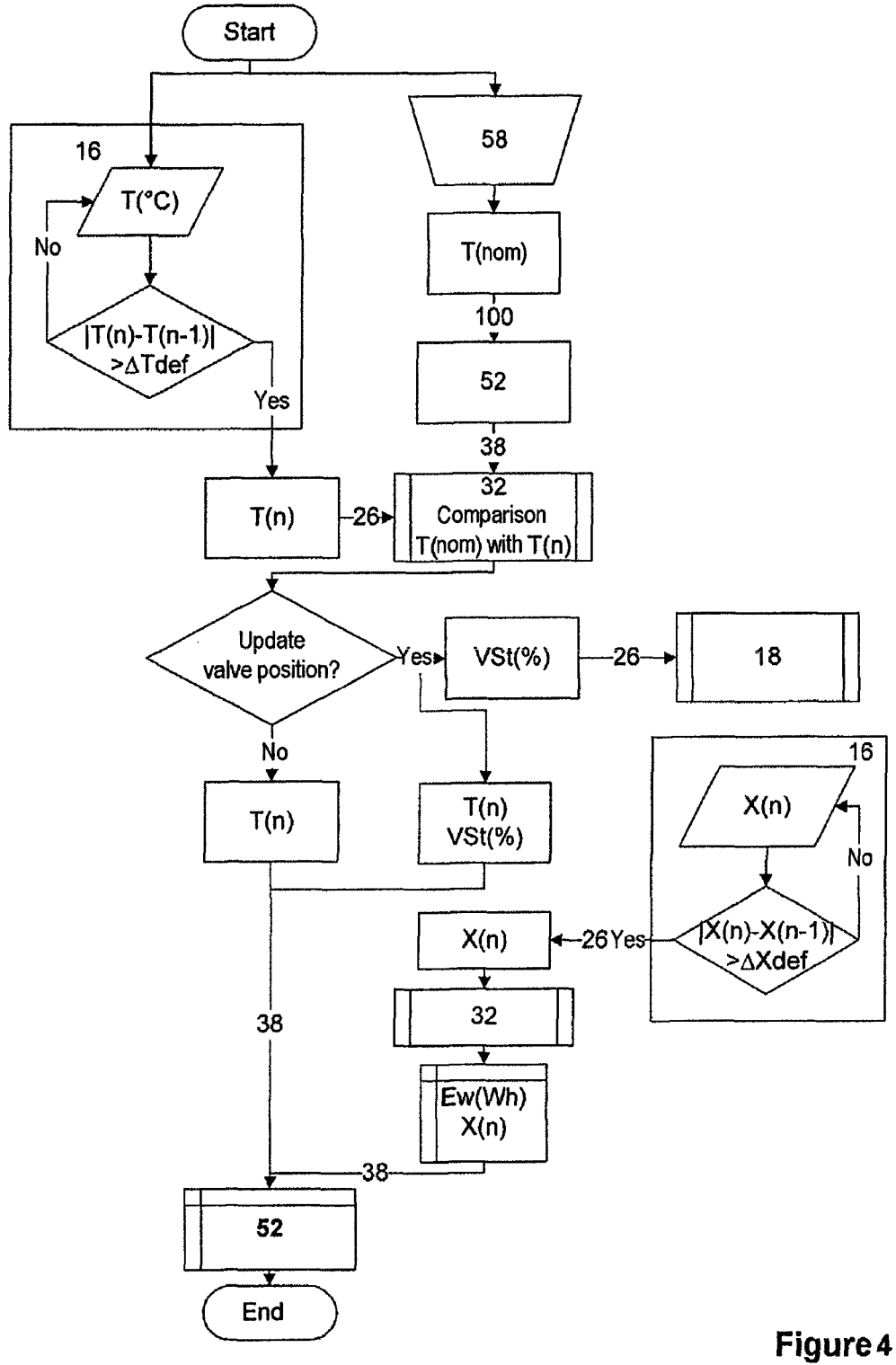
FIG. 4: shows a block diagram for the closed-loop control of a room function.

FIG. 4 shows a block diagram of a control function for temperature regulation of a room 8. The dwelling central unit 52 is accessed via an Internet link 100 using a mobile telephone 58, and the desired nominal temperature $T_{nom}$ for the room 8 is thus changed. The nominal temperature for a room 8 is transmitted from the central unit 52 via the data line 38 to the control unit 32 for the appropriate room 8. A sensor 16 which determines the instantaneous room temperature T(n) is arranged in the room 8. When the room temperature changes, the room sensor 16 sends the instantaneous room temperature T(n) via the radio link 26 to the control unit 32. The control unit 32 compares the instantaneous value of the room temperature T(n) with the nominal value for the room temperature $T_{nom}$. The control unit uses this comparison as the basis for calculating the position of the heater valve Vst (%). If there is no need to change the position of the heater valve, the control unit 32 sends a signal with the instantaneous room temperature T(n) via the data line 38 to the dwelling central unit 52. A dwelling central unit 52 stores the instantaneous value for the room temperature T(n) in the database. If the valve body position has to be changed, a signal with the nominal heater valve position Vst (%) is sent via the radio link 26 to the actuator 18 which has a control and positioning function for the heater valve position. Furthermore, the instantaneous room temperature T(n) as well as the nominal heater valve position Vst (%) transmitted to the actuator of the heater valve are transmitted via the data line 38 to the dwelling central unit 52, and are stored in the data base there.

Furthermore, a sensor 16 for temperature recording is fitted to the heater and, in conjunction with the sensor 16 for the room temperatures, carries out the function of an electrical heating cost distributor. On the basis of the sensor values x(n) which are transmitted via the radio link 26 to the control unit 32, the latter calculates the heater thermal energy Ew(Wh). The heat energy Ew(Wh) is transmitted via the data line 38 to the dwelling central unit 52, and is stored in the data base for the consumption values.

Figure 5:
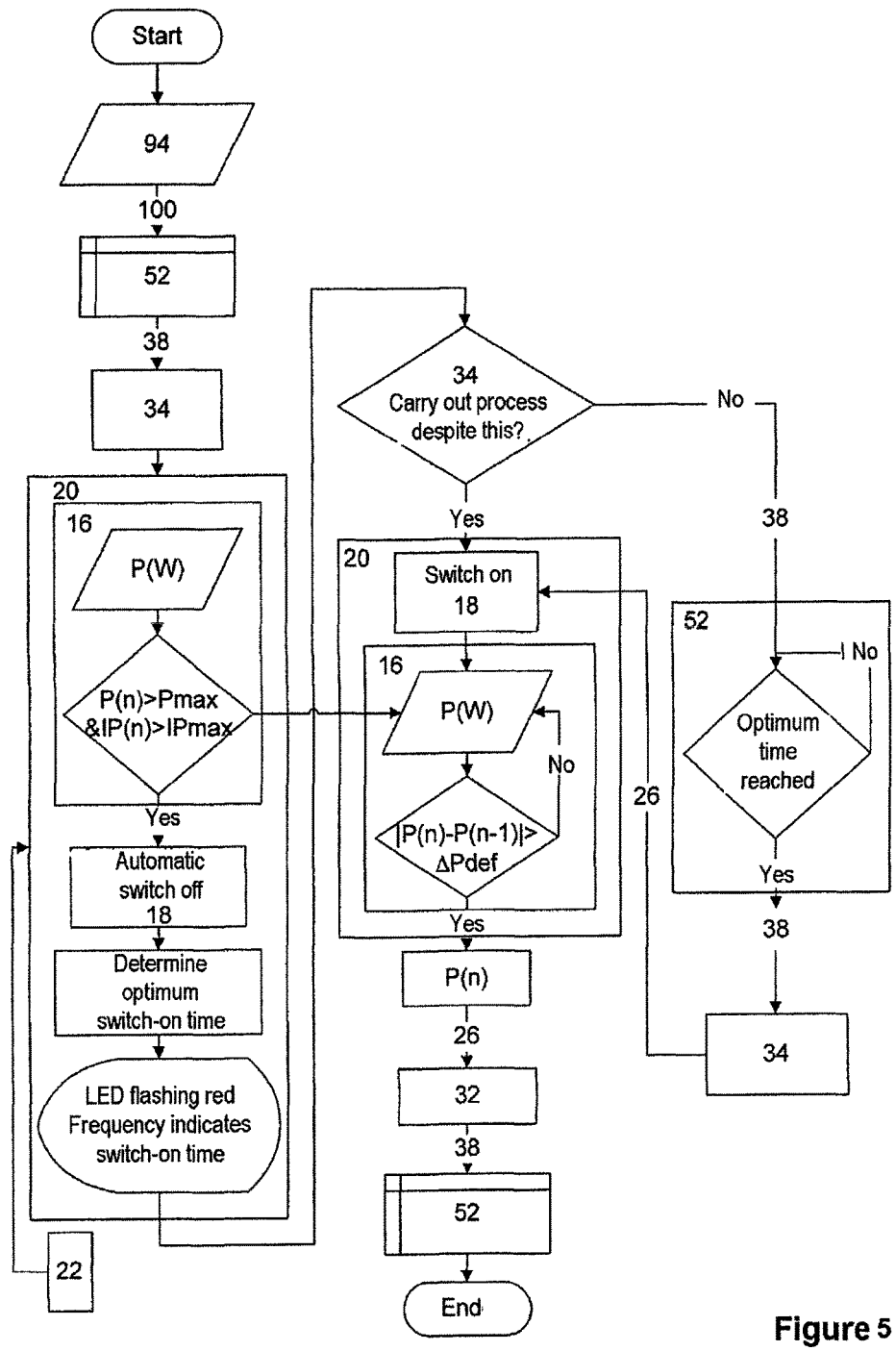
FIG. 5: shows a first block diagram for load switching that is dependent on the electricity tariff.
Figure 6:
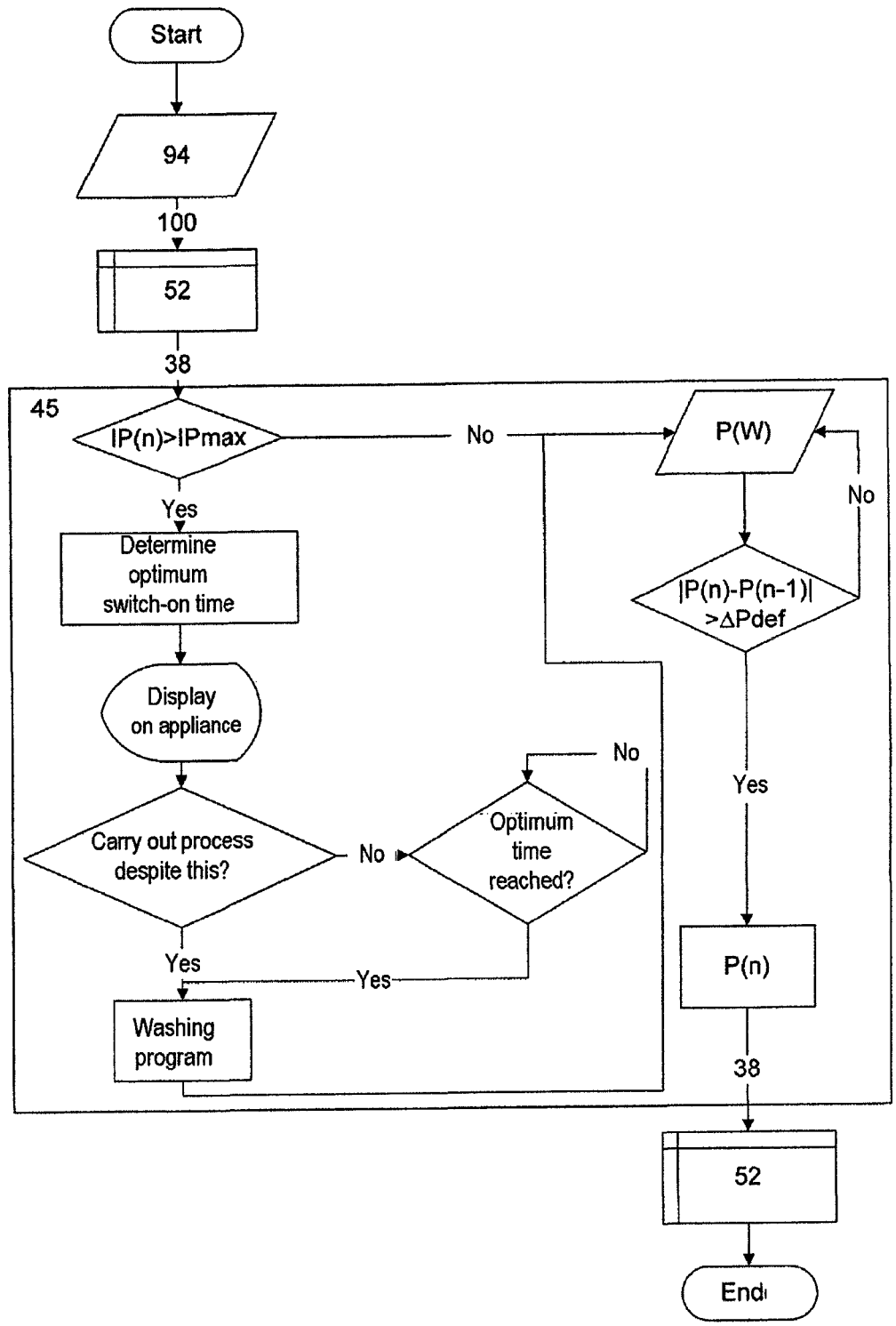
FIG. 6: shows a second block diagram for load switching which is dependent on the electricity tariff.

In the future, the energy supply companies will offer electricity price tariffs which are dependent on the time of day. On the basis of these time-dependent electricity tariffs, it may be worth while operating certain electrical loads, such as a washing machine, with a time delay, such as they are operating between a time when the electricity tariff is better. FIGS. 5 and 6 use a block diagram to show a method such as this, which can be carried out using the building automation and building information system according to the invention.

As shown in FIG. 5, the dwelling central unit 52 receives the time-dependent electricity profiles from the energy supplier 94 via the Internet 100. The time-dependent electricity tariffs are stored in the database in the dwelling central unit 52, and are transmitted by the data line 38 to the multifunction unit 34. The multifunction unit 34 transmits the electricity tariffs to the intelligent plug socket 20. In addition to sensors 16 for measurement of the consumed power and a relay as actuators 18 for switching the connected load 22, the intelligent plug socket 20 also contains a memory module and a control module. The plug socket 20 stores the electricity tariffs in the memory module. When the load 22 is set up by a user, the consumed power P(n) is measured by the sensors 16, and the measured power P(n) as well as a power/time profile of the load 22 are stored in the memory module. If the predefined power threshold $P_{max}$ for standby operation is exceeded, a so-called switch-on profile in the form of a power/time profile is compared after a predetermined time with predetermined switch-on profiles of known loads, and the load 22 is determined from this. In addition, if the electricity price IP(n) during operation of the load 22 is higher than a predefined threshold value $IP_{max}$, the actuator 18 disconnects the load 22 from the mains. By way of example, the threshold value $IP_{max}$ is determined by multiplying the best electricity price by a factor which can be defined in advance.

The intelligent plug socket 20 uses the already known electricity/time profile of the load 22 and the time-dependent electricity tariffs as the basis for calculating a cost-optimized time for the process of switching on the load 22, and indicates this switching-on time via a flashing frequency of an LED on the plug socket 20. In addition, the intelligent plug socket 20 transmits the load type and the best switching-on time to this multifunction unit 34. This is displayed in graphics form to the user on the touch-sensitive display 36 of the multifunction unit 34. In addition, the amount in Euros which is saved by operation at the optimum time in comparison to immediate operation is displayed to the user. The user can now choose whether the switching-on process should be continued or whether the load should be operated at the cost-optimized time. If operation at the cost-optimized time is selected, the switch-on time and the operating duration are indicated on the touch-sensitive display 36. Alternatively, the time-delayed switching-on process can be activated, or rejected, on the plug socket 20 itself, by means of a capacitive touchpad. A signal with the switching-on time is transmitted to the dwelling central unit 52. When the switch-on time is reached, a signal to switch on the load 22 is sent via the data line 38 to the multifunction unit 34, and via the radio link 26 further to the plug socket 20. The actuator 18 now connects the load 22 to the electrical mains system.

If the user chooses the "continue the switching-on process" option on the touch-sensitive display 36 or on the capacitive pushbutton on the plug socket 20, or there is no input on the touch-sensitive display 36 within a predefined time period, then the multifunction unit 36 sends a signal to the plug socket 20, to switch it on, via the radio link 26.

If the load 22 is switched on at a time at which the electricity price IP(n) is below the predefined threshold value $IP_{max}$ during operation of the load 22, or cost-optimized switching on is deactivated for the load 22, the load 22 is not disconnected from the mains by the actuator 18, as a result of which the process of switching on the load is not interrupted.

The measured values from the sensors 16 in the plug socket 20 for determining the consumed power are transmitted by the radio link 26 to the multifunction unit 34 and by the data line 38 further to the central unit 52, where the consumption data is stored in the database.

In the block diagram illustrated in FIG. 6, the washing machine 45, which has a Powerline communication module, is connected to the dwelling central unit 52 via the data line 38. The time-dependent electricity profiles can therefore be stored in a memory module in the washing machine 45. When the washing process is started, the washing machine 45 indicates in graphics form on the display a check as to whether the washing program should be carried out immediately or, for example, at the cost-optimum time. In this case, both the start time and the amount of money saved are displayed. If the optimum start time is chosen, the washing machine 45 does not start until the predetermined start time is reached. The washing machine 45 contains a clock for this purpose.

In a similar manner to the block diagram illustrated in FIG. 5, immediate washing start can also be selected, or can be activated automatically if there is no user input. In addition, the energy consumed by the washing machine 45 is measured by power measurement sensors integrated in the washing machine 45, and is sent via the data line 38 to the dwelling central unit 52 for storage in the database.

Figure 2:
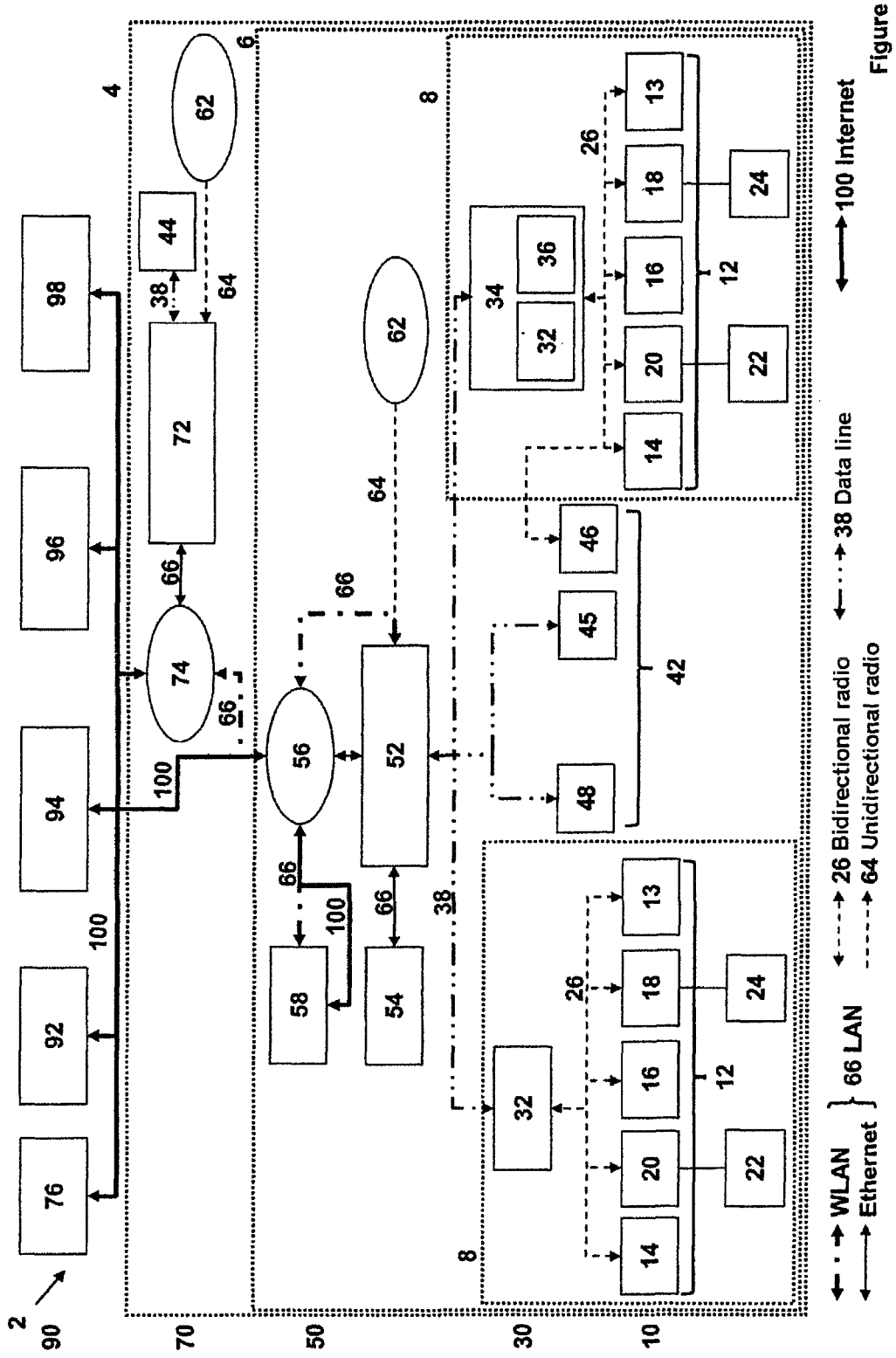
FIG. 2: shows a second embodiment of a building automation and building information system.

The second exemplary embodiment, which is illustrated in FIG. 2, differs from the first exemplary embodiment, which is illustrated in FIG. 1, in that the system architecture has an additional level, a building level 70. The building level 70 is arranged between the service level 90 and the dwelling level 50 in the system architecture. A system architecture such as this is advantageous for buildings 4 with a plurality of dwelling units or dwellings, and central devices such as central heating including a heating control system 44. The building level 70 has a building central unit 72. The building central unit 72 is connected to a plurality of dwelling central units 52 via a LAN link 66. In contrast to exemplary embodiment 1, building-wide functionalities are carried out by the building central unit 72 rather than by the dwelling central unit 52. The building central unit 72 is connected directly to the consumption meters 62 for the building 4 via wireless M-Bus 64. Furthermore, the building central unit 72 collects the consumption data of the individual dwelling units for communal cost billing. Electronic heating cost distributors 13 for heating cost billing are connected indirectly to the building central unit 72 via the respective control units 32 and the dwelling central units 52. Furthermore, the building central unit 72 monitors and provides open-loop and closed-loop control for the heating control system 44. For this purpose, the building central unit 72 uses the relevant data from the dwelling central units 52 which are provided in the building 4.

The building central unit 72 is connected to a further DSL router 74 for its remote servicing. The building central unit 72 can therefore be accessed via an external PC 76, in which case not only can data be checked but parameters can also be modified.

In addition to the variant using the first DSL router 56 as shown in the exemplary embodiment 1, the dwelling central unit 52 can also be accessed from an external PC or mobile telephone 58 in this exemplary embodiment via a second DSL router 74 and the building central unit 72 (not shown). For this purpose, the second DSL router 74 uses an integrated web server to provide a graphics user interface for control and monitoring of the individual dwelling central units 52. In this case, access rights ensure that access can be made only to the authorized dwelling central unit 52 or building central unit 72.

FIG. 7 shows a detail of a building automation and building information system 2 as shown in FIG. 1, illustrated in simplified form, and which additionally has a universal interface 102 and a central computer 104. The universal interface 102 and the central computer 104 are integrated in the dwelling central unit 52. Furthermore, the dwelling central unit 52 is connected via a data line 38 to a further universal interface 102. The universal interface 102 is connected via a bus line 108 to incompatible components 106, that is to say components which are incompatible with the building automation and building information system 2. A further incompatible component 106 has an integrated universal interface 102, and is connected via bidirectional radio 64 to the dwelling central unit 52.

The central computer 104 has a database in which state data of the components 12, of the further components 42, of the incompatible components 106 and further state parameters of the building automation and building information system 2, for example state parameters of the control units 32 or of the dwelling central unit 52, are defined and stored in a system-independent language. Furthermore, various functional groups are defined, via which the associated components 12, 42, 106 and control and central units 32, 52 can be operated.

The universal interfaces 102 are used as converters, in order to translate the respective language, in particular commands and state parameters, of the building automation and building information system 2 as well as the incompatible components 106, to the system-independent language of the central computer 104, by means of a protocol. This allows state information relating to the building automation and building information system 2 and the incompatible components 106 to be synchronized to the central computer 104. Furthermore, commands which are generated in the building automation and building information system 2 can also be passed to the incompatible components 106 via the central computer. A corresponding procedure is also possible in the opposite direction. This also allows incompatible components 106 to be integrated in the building automation and building information system 2.

The invention claimed is:

1. A building automation and building information system having a system architecture with different hierarchy levels, the system comprises a central unit arranged at a higher hierarchy level in the system architecture, at least one control unit and first system components arranged at a lower hierarchy level in the system architecture, wherein the central unit comprises a central database, the central database being configured to store (i) state data and consumption data, (ii) a data history of said state data and consumption data, (iii) store state changes with a time stamp, and (iv) parameters of control profiles for the building automation and building information system, and to call up the data history and an instantaneous state of the building automation and information system;

wherein the central unit is connected to the at least one control unit via a bidirectional data line, is configured to receive data from the at least one control unit, and is configured to provide open-loop and/or closed-loop control of the at least one control unit;

wherein each control unit is associated with at least one first system component, to which the control unit is connected by a radio, and the control unit comprises means for open-loop and/or closed-loop radio control of the associated at least one first system component;

wherein the control unit adaptively matches events linked to predefined consequences associated with consumption activity, wherein the system analyzes user behavior corresponding to the system components; assigns or updates a user control profile in the central database, stores instantaneous and variable control parameters based on at least time, consumption data and one or more functional hierarchical groups corresponding with one or more jointly operative system components; and utilizes the stored instantaneous and variable control parameters to operate the one or more jointly operative system components of the one or more functional hierarchical groups, wherein the central unit is configured to adaptively match, by a degree of adaptive matching freely settable to any value between 0 and 100%, control of the building automation and building information system to user data comprising the consumption data and state data recorded over a time period representing behavior of the user, wherein, for a 0% adaptation degree, the control profiles are not changed, and are not matched to the behavior of the user, and, for a 100% adaptation degree, the control profiles are matched to the behavior of the user, wherein intermediate values result in a continuously variable change in the adaptation degree between 0% and 100%, wherein the first system components which are associated with each control unit are connectable to one another by radio; and wherein the central unit, the at least one control unit and the first system components each have a plug-and-play capability.

2. The building automation and building information system as claimed in claim 1, wherein the central unit comprises at least one dwelling central unit and one building central unit, which are connected to one another via a bidirectional data line.

3. The building automation and building information system as claimed in claim 1, wherein the plug-and-play capability is in accordance with the UPnP Standard.

4. The building automation and building information system as claimed in claim 1, wherein the data line is a power supply line.

5. The building automation and building information system as claimed in claim 4, wherein the power supply line supplies power to the central unit and the control unit.

6. The building automation and building information system as claimed in claim 1, wherein the data line comprises a radio link.

7. The building automation and building information system as claimed in claim 1, wherein the first components are equipped with energy harvesters.

8. The building automation and building information system as claimed in claim 1, wherein at least one further component is connected to the central unit and/or the control unit.

9. The building automation and building information system as claimed in claim 8, wherein the connection of at least the further component to the central unit and/or the control unit is via the data line.

10. The building automation and building information system as claimed in claim 8, wherein connection of the at least the further component to the central unit is via the control unit.

11. The building automation and building information system as claimed in claim 1, wherein at least one of the control units has a first user interface.

12. The building automation and building information system as claimed in claim 11, wherein the first user interface is a touch-sensitive display.

13. The building automation and building information system as claimed in claim 12, wherein a second user interface is connected to the central unit.

14. The building automation and building information system as claimed in claim 13, wherein the second user interface is connected to the central unit via a wire-based or wireless local computer network.

15. The building automation and building information system as claimed in claim 13, wherein the second user interface is a PC.

16. The building automation and building information system as claimed in claim 13, wherein the second user interface is a web server for providing a graphics user interface.

17. The building automation and building information system as claimed in claim 1, wherein the central unit comprises means for reception of data from external devices.

18. The building automation and building information system as claimed in claim 1, wherein the central unit comprises means for transmission of data to external devices.

19. The building automation and building information system as claimed in claim 18, wherein the transmitted data is consumption data for consumption cost billing.

20. The building automation and building information system as claimed claim 1, further comprising incompatible components integrated in the system via a universal interface and a central computer.

21. The building automation and building information system as claimed in claim 20, wherein the universal interface and the central computer are integrated in the central unit and/or in the control unit.

22. The building automation and building information system as claimed in claim 1, further comprising a universal interface by means of which the building automation and building information system can be coupled as a subsystem to at least one of another subsystem, another appliance, another component, another network or another building automation and building information system.

23. The building automation and building information system as claimed in claim 1, wherein the degree of the adaptive matching can be chosen freely by the user.

24. The building automation and building information system as claimed in claim 1,
wherein the central unit is further configured to update the control profiles based on data that is newly stored in the data base.

* * * * *